(12) United States Patent
Roemer et al.

(10) Patent No.: US 8,944,266 B2
(45) Date of Patent: Feb. 3, 2015

(54) FLOOR-MOUNT SERVICE CONTAINER AND LID

(75) Inventors: Henry Roemer, Kelowna (CA); Gordon Almond, Kelowna (CA); Conrad Marini, Woodbridge (CA); Marco Paesano, Woodbridge (CA)

(73) Assignee: DIRTT Environmental Solutions Ltd., Calgary (CA)

( * ) Notice: Subject to any disclaimer, the term of this patent is extended or adjusted under 35 U.S.C. 154(b) by 807 days.

(21) Appl. No.: 12/232,702

(22) Filed: Sep. 23, 2008

(65) Prior Publication Data

US 2010/0072198 A1 Mar. 25, 2010

(51) Int. Cl.
| | |
|---|---|
| *H02G 3/08* | (2006.01) |
| *B65D 43/14* | (2006.01) |
| *B65D 51/04* | (2006.01) |
| *H02G 3/02* | (2006.01) |
| *H02G 15/02* | (2006.01) |
| *H02G 15/08* | (2006.01) |
| *H02G 3/18* | (2006.01) |

(52) U.S. Cl.
CPC .................................. *H02G 3/185* (2013.01)
USPC ............... 220/3.3; 220/3.2; 220/3.4; 220/3.5; 220/3.8; 174/76

(58) Field of Classification Search
USPC ............. 220/3.2, 3.3, 3.4, 817, 818, 3.5, 3.8; 174/67
See application file for complete search history.

(56) References Cited

U.S. PATENT DOCUMENTS

| | | | |
|---|---|---|---|
| 1,271,478 A | 7/1918 | Krantz | |
| 2,996,566 A | 8/1961 | Stas | |
| 3,485,933 A | 12/1969 | Flachbarth | |
| 3,956,573 A | 5/1976 | Myers et al. | |
| 4,054,222 A | 10/1977 | Suk | |
| 4,297,524 A | 10/1981 | Fork | |
| 4,591,656 A | 5/1986 | Mohr | |
| 4,721,476 A * | 1/1988 | Zeliff et al. | .................... 439/142 |
| 5,007,549 A | 4/1991 | Suk | |
| 5,008,491 A | 4/1991 | Bowman | |
| 5,020,450 A * | 6/1991 | Lichter | ........................... 109/50 |
| 5,064,969 A * | 11/1991 | Bloom | ........................... 174/67 |
| 5,179,252 A | 1/1993 | Yang | |
| 5,180,074 A | 1/1993 | Bowman et al. | |
| 5,257,487 A | 11/1993 | Bantz et al. | |
| 5,285,009 A | 2/1994 | Bowman et al. | |
| 5,342,993 A | 8/1994 | Siems | |
| 5,350,884 A | 9/1994 | Littrell | |

(Continued)

FOREIGN PATENT DOCUMENTS

CA 2407127 4/2003

OTHER PUBLICATIONS

Canadian Office Action, Dated Jan. 30, 2014.

*Primary Examiner* — Fenn Mathew
*Assistant Examiner* — Andrew T Kirsch
(74) *Attorney, Agent, or Firm* — Workman Nydegger

(57) ABSTRACT

Implementations of the present invention relate to a floor-mounted container that includes a rigid lower container portion defining an upper opening and a rim of the container, a flange extending from the rim and configured to support the container on edges surrounding a hole in the floor, when the container is mounted in the floor, and a lid with one or more trap-doors, the lid pivotally mounted to the rigid lower container portion and configured to pivot approximately 180 degrees from a covering position to an open position.

22 Claims, 7 Drawing Sheets

(56) References Cited

U.S. PATENT DOCUMENTS

| | | |
|---|---|---|
| 5,455,388 A | 10/1995 | Pratt |
| 5,627,340 A | 5/1997 | Smith et al. |
| 5,796,037 A | 8/1998 | Young et al. |
| 5,925,849 A | 7/1999 | Chen |
| 5,943,833 A | 8/1999 | Feldpausch et al. |
| 6,085,667 A | 7/2000 | Gevaert et al. |
| 6,162,071 A | 12/2000 | Muller |
| 6,179,634 B1 | 1/2001 | Hull et al. |
| 6,194,657 B1 | 2/2001 | Gretz |
| 6,265,662 B1 | 7/2001 | Riedy et al. |
| 6,450,353 B1 | 9/2002 | Riedy et al. |
| 6,469,249 B2 | 10/2002 | Capella |
| 6,564,428 B2 * | 5/2003 | Richard et al. ................. 16/366 |
| 6,610,927 B2 * | 8/2003 | Dinh et al. ..................... 174/66 |
| D484,097 S | 12/2003 | Drane |
| 6,669,041 B2 * | 12/2003 | Almond ......................... 220/3.6 |
| 6,979,209 B2 | 12/2005 | Griepentrog |
| 7,045,706 B1 | 5/2006 | Lincoln, III et al. |
| 7,075,005 B1 | 7/2006 | Drane |
| 7,105,745 B2 | 9/2006 | Drane et al. |
| 7,126,059 B2 | 10/2006 | Dinh et al. |
| 7,183,503 B2 | 2/2007 | Bowman et al. |
| D539,229 S | 3/2007 | Murphy |
| 7,193,160 B2 | 3/2007 | Dinh |
| 7,205,488 B2 | 4/2007 | Riner |
| 7,276,662 B2 | 10/2007 | Drane |
| 7,300,025 B2 * | 11/2007 | Korcz ............................ 248/56 |
| 2004/0164207 A1 * | 8/2004 | Decanio et al. ............... 248/27.3 |
| 2006/0011641 A1 * | 1/2006 | Sanderson .................... 220/835 |
| 2006/0060368 A1 | 3/2006 | Dinh |
| 2008/0054135 A1 * | 3/2008 | Galasso et al. ................ 248/201 |

* cited by examiner

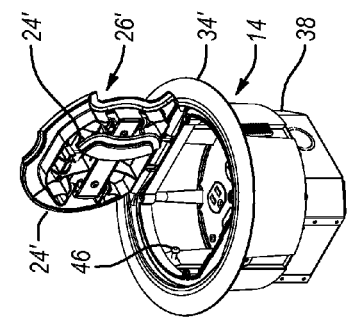
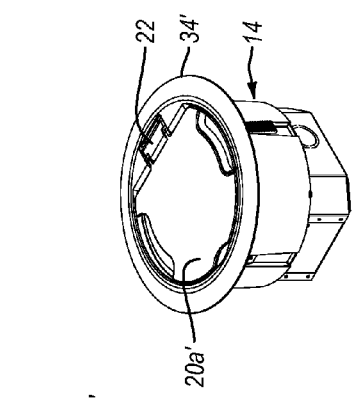
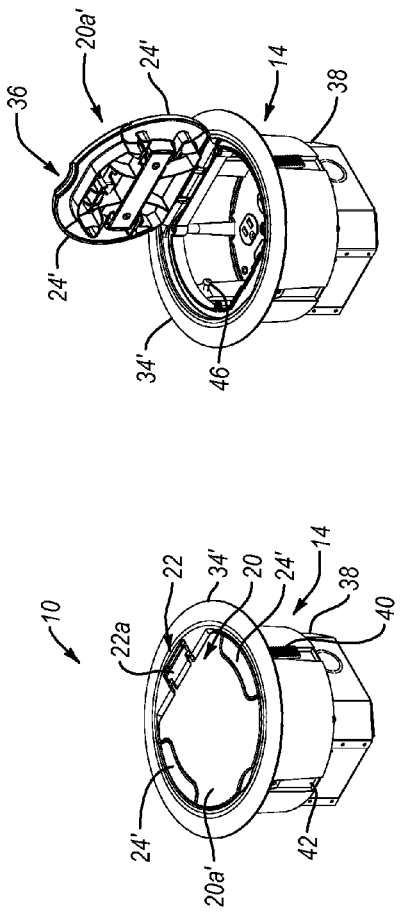
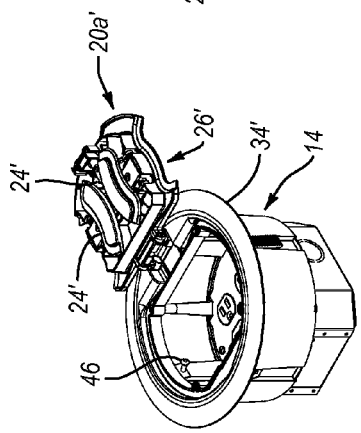
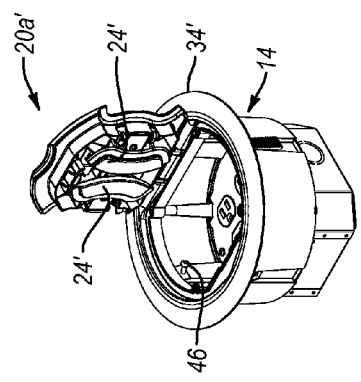

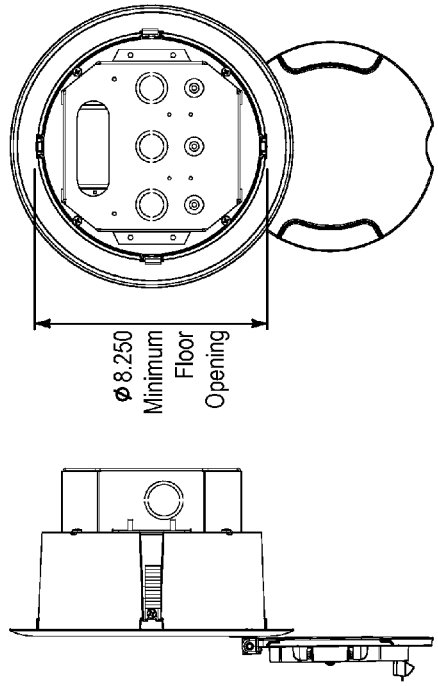
*Fig. 20*
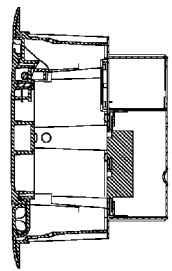
*Fig. 19*
*Fig. 22*
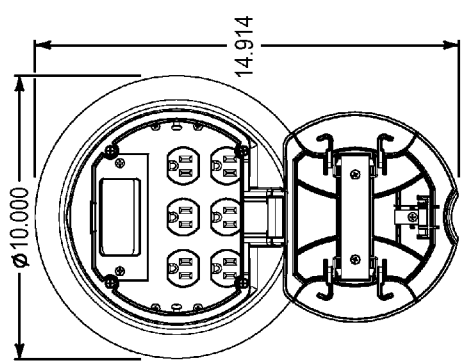
*Fig. 18*
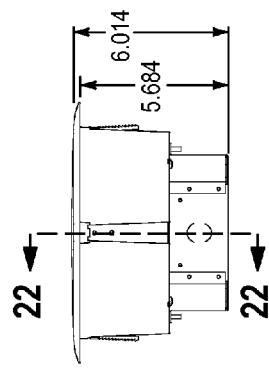
*Fig. 21*

FLOOR-MOUNT SERVICE CONTAINER AND LID

FIELD OF THE INVENTION

This invention relates to a telecommunication and/or electrical service container such as a box which may be mounted recessed into the floor of a building so that telecommunication, electrical and other services provided by wires, cables or the like may be conveniently supplied for example in close proximity to a work station.

BACKGROUND OF THE INVENTION

In one example of an environment where the present invention would be an improvement, the modern work station of an office contains an assortment of electrically operated hardware each requiring one or more separate connections to electrical, and telecommunication outlets, including computer network or internet outlets. Such outlets may not be conveniently located in relation the work station, requiring that the electrical cords inconveniently extend along the surface of the floor between the equipment and the outlet. Such cords, then, can become an inconvenience and a potential hazard to those walking near the work station. Additionally they may become accidentally detached from the outlet resulting in inconvenience to the user and possible loss of data. Consequently there exists a need for an improved service box which may be flush-mounted into a floor to provide unobtrusive access to electrical and/or telecommunication outlets in the box, while with respect to creating new hazards by reason of the service box lid being open.

In the prior art applicant is aware of U.S. Pat. No. 6,669,041 which issued to Almond on Dec. 30, 2003 for a telecommunication and electrical service box mounting in a floor, in which he discloses a service box for mounting in a floor, wherein the box includes a rigid container having a lid covering an upper opening into the container. A handle is disclosed which is rigidly mounted to the lid at a mid-point of the side opposite to a hinge mounting to the service box. The handle is lifted so as to pivot upwardly from the lid thereby exposing an aperture in the lid through which cables are passed. The under-surface of the handle may be lined with a layer of foam rubber or other resilient material to inhibit abrading or crimping of the cables passed through the aperture.

In the prior art, applicant is also aware of U.S. Pat. No. 4,721,476 which issued to Zeliff et al for an Electrical Connection Box used in conjunction with raised floors. Zeliff et al provide an electrical connector box adapted to be used in connection with a raised floor concept wherein a plurality of rectangular openings are formed in the raised floor and the electrical connector box lowered into engagement with a frame in the openings and into the space between the raised floor and a main floor. A hinge top plate is provided for access to the interior of the electrical connector box. Finger-like openings in the top plate provide access to the electrical connector box when the top plate is closed so that wires, etc can be connected to various types of electrical equipment. The fingers may be pivoted inwardly into the electrical connector box so as to provide access to the connector terminals. The top plate is provided with a hinge structure capable of permitting hinge movement between a vertical open position and a closed position lying flush on flanges which over lap the raised floor.

SUMMARY OF THE INVENTION

The telecommunication and electrical service box of the present invention assists in overcoming the undesirable and inconvenient aspects of having the electrical cords extend along the surface of the floor by providing a service box, for example containing a plurality of electrical, telephone and computer network outlets, which may be positioned within a floor for example in proximity to a work station, while creating new hazards by reason of the box lid presenting an obstacle to trip over when the box is open.

In summary the floor-mounting container and lid according to the present invention may be characterized in one aspect as including a rigid lower container portion having sidewalls defining a rim extending around an upper opening into the container, a flange extending substantially perpendicularly from the rim for supporting the container when mated into a hole in the floor, so as to rest the flange on an edge of the floor surrounding the hole, and a lid having a 180 degree hinge and a trap-door. In particular, the lid is pivotally mounted by an edge of the lid adjacent the rim by a substantially 180 degree pivoting first hinge. The lid is pivotable between a covering position substantially covering the upper opening, and a fully open position pivoted substantially 180 degrees from the covering position. The lid may have a notch or other indentation (collectively referred to herein as a notch) formed therein. The trap-door is pivotally mounted in cooperation with the lid and sized to nest in the notch when the trap-door is in a closed position. The trap-door is pivotable between the closed position, and an open position depending downwardly into the upper opening and below the lid when the lid is in its covering position so as to leave open the notch as an access port into the upper opening of the lower container portion.

Advantageously, the trap-door is pivotally mounted to the lid, and, further, may be pivotally mounted by a second hinge to a second edge of the lid. In one embodiment the first edge of the lid is opposite the second edge of the lid.

The first hinge may be a double-acting hinge, in which case it advantageously may include a rigid hinge block having opposite first and second side, edges spaced apart by a first depth dimension the hinge block pivotally mounted along the first side edge thereof adjacent the rim, and pivotally mounted to the lid along the opposite second side edge thereof. The first side edge of the hinge block may in particular be pivotally mounted to the flange, and wherein the opposite second side edge of the hinge block may be pivotally mounted to the first edge of the lid.

In a further embodiment, the lid includes at least a second notch, and the container further includes at least a second trap-door pivotally mounted in cooperation with the lid for providing a user access to the upper opening when the lid is in the covering position. The first and second trap-door collectively then form a pair of trap-doors. The pair of trap-doors may be pivotally mounted to the lid. For example, the pair of trap-doors may be mounted in oppositely disposed relation to corresponding opposite edges of the lid. In such an embodiment a finger notch may be formed in a trap-door or an edge of the lid. The finger notch is sized for a user to insert at least the end of a finger in order to pull open the lid.

Each trap-door and its corresponding trap-door hinge form a mechanism, a portion of which may abut a portion of the lid which is formed as a stop when the trap-door is in the closed position, whereby the trap-door is prevented from pivoting to a position substantially elevated above the lid when the lid is in its covering position.

The service box can be simply and conveniently secured in place by retaining clamps positioned off-centre within a recessed portion of opposite side walls. In the normal position the clamps lie nested within their respective recess, permitting the service box to be easily inserted with the floor aperture. Clockwise rotation of a threaded adjusting bolt, accessible from within the service box with the lid raised, rotates a clamp arm outwardly of the recess engaging a side wall of the recess. Further rotation of the adjusting bolt results in the raising of the clamp arm on the threaded adjusting bolt until firm engagement is made with the underside of the floor. Counter clockwise rotation of the threaded adjusting bolt results in the lowering of the clamp arm until it is free of the underside of the floor at which point it rotates to nest within its respective recess allowing easy removal of the service box from the floor aperture.

Each clamp and bolt may be described as, respectively, an elongate cantilevered member which is threadably mounted at a first end thereof onto a first threaded member. The first threaded member is helically threaded so that rotation of the first threaded member in a first direction about its longitudinal axis urges the cantilevered member in upward translation along the first threaded member. The cantilevered member is threadably mounted in threaded engagement on the first threaded member so that, as the cantilevered member is urged in the upward translation by rotation of the first threaded member in the first direction, the cantilevered member is simultaneously urged to rotate also in the first direction by friction in the threaded engagement between the cantilevered member and the first threaded member.

A stop is formed in each recess. Herein such a stop is meant to include an edge formed along one side of the recess. The stop is for arresting the rotation of the cantilevered member in the first direction once the cantilevered member has rotated to an extended position protruding cantilevered from the recess so as to extend outwardly of the sides of the container. The stop may thus be a generally vertically extending edge of the recess. The first threaded member is rotatable in a second direction opposite the first direction so as to translate the cantilevered member downwardly, and so as to urge, by the threaded engagement, the cantilevered member to rotate also in the second direction into a retracted position nested entirely within the recess. Each recess is sized to receive the cantilevered member nested entirely therein when in its retracted position. In a further embodiment, the container includes a pair of recesses and corresponding cantilevered members mounted on their threaded members, mounted so as to be oppositely disposed on opposite sides of the container.

BRIEF DESCRIPTION OF THE DRAWINGS

FIG. 11 is, in perspective view, a floor mounted service container and lid according to an alternative embodiment of the present invention showing the lid and pair of trap doors fully closed.

FIG. 12 is the service container and lid of FIG. 11, with the lid open to a vertical orientation.

FIG. 13 is the service container and lid of FIG. 12, with one trap door opened in the lid.

FIG. 14 is the service container and lid of FIG. 13 with a second trap-door opened in the lid.

FIG. 15 is the service container and lid of FIG. 14 with the lid rotated 180 degrees backwards.

FIG. 16 is, the service container and lid of FIG. 15, with the lid fully closed and the trap-doors open to provide access into the interior cavity of the housing.

FIG. 18 is the service container and lid of FIG. 16 in plan view.

FIG. 19 is, in right side elevation view, the service container and lid of FIG. 18.

FIG. 20 is, in bottom view, the service container and lid of FIG. 19.

FIG. 21 is, in front elevation view, the service container and lid of FIG. 11.

FIG. 22 is a sectional view along line 22-22 in FIG. 21.

DETAILED DESCRIPTION OF EMBODIMENTS OF THE INVENTION

Figure 1:
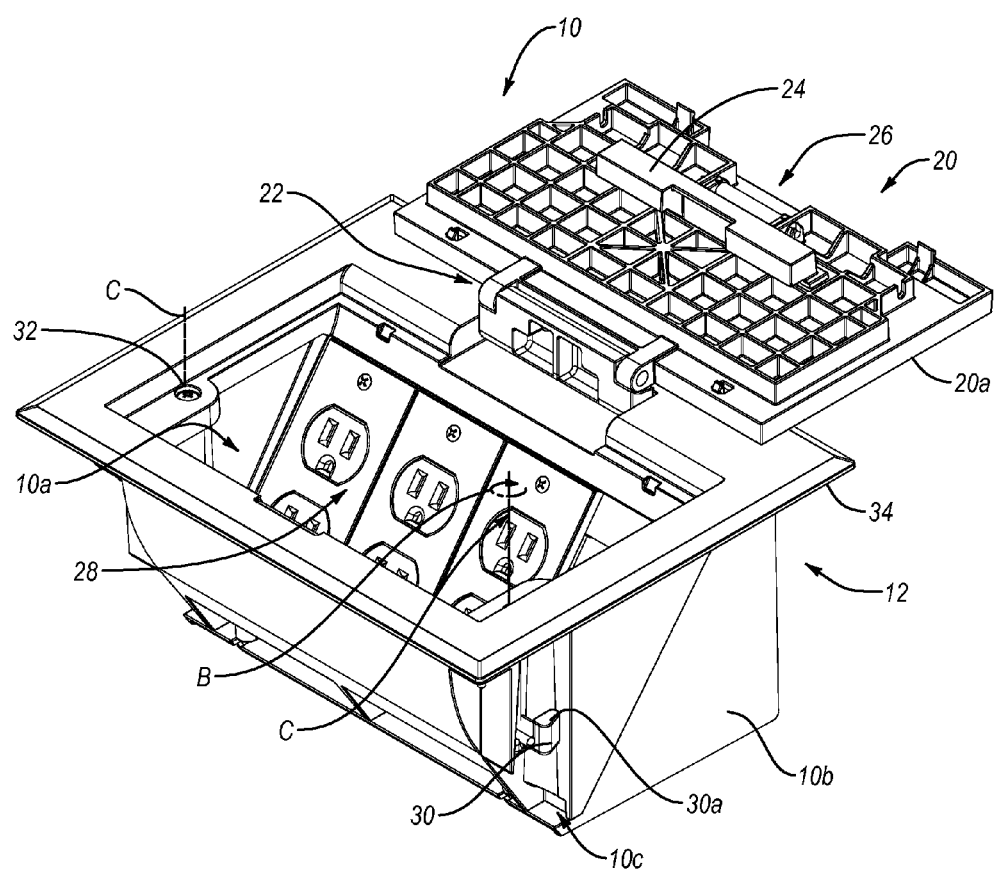
FIG. 1 is, in perspective view, a floor mounted service container and lid according to the present invention showing the lid open and rotated backwardly substantially 180 degrees, and the trap-door in the lid fully open.
Figure 4:
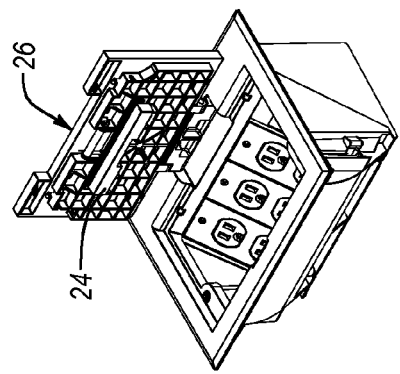
FIG. 4 is the service container of FIG. 3 with the lid in the vertically open position and the trap-door rotated so as to open an access port in the lid.
Figure 5:
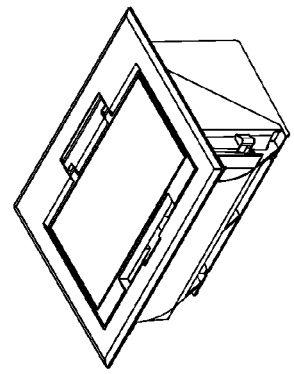
FIG. 5 is the service container of FIG. 2 showing the trap-door open so as to expose the access port in the lid.
Figure 3:
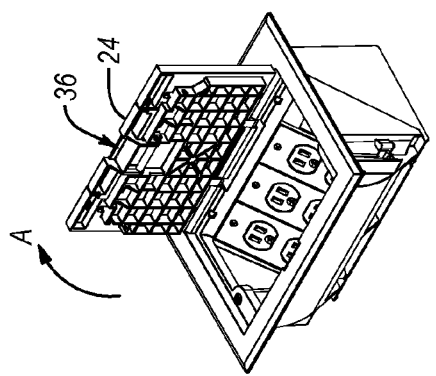
FIG. 3 is the service container of FIG. 2 with the lid and trap-door rotated to a vertically open position.
Figure 2:
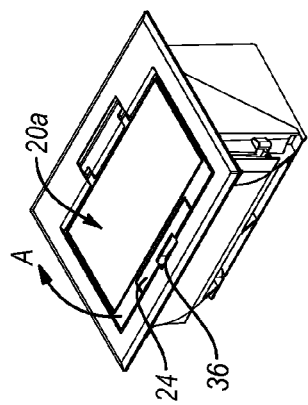
FIG. 2 is the service container of FIG. 1 with the lid fully closed and the trap-door in the lid also closed, closing off access to the inside of the service container.
Figure 6:
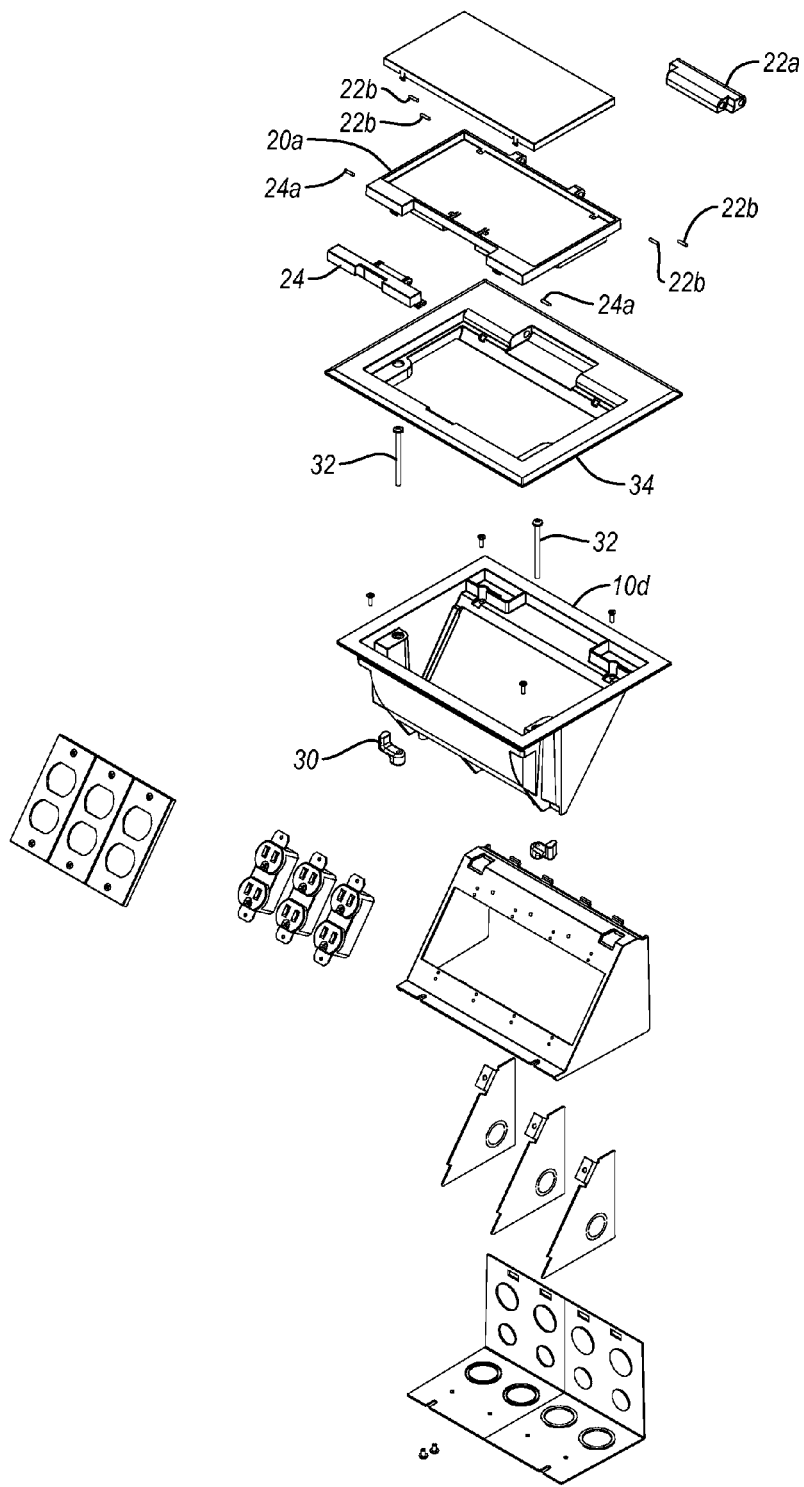
FIG. 6 is, in exploded view, the service container of FIG. 1.
Figure 7:
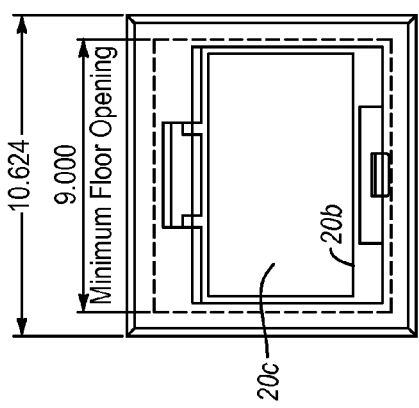
FIG. 7 is, in plane view, the service container of FIG. 2.
Figure 9:
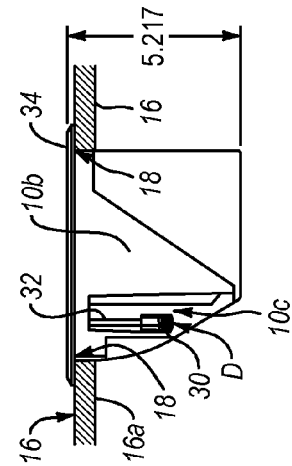
FIG. 9 is a sectional view along line 9-9 in FIG. 8.
Figure 8:
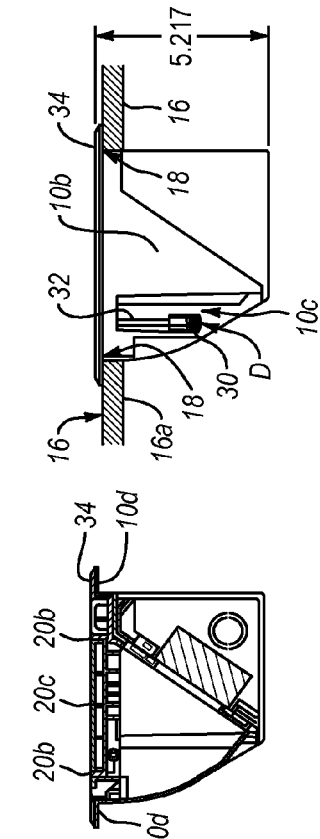
FIG. 8 is, in front elevation view, the service container of FIG. 7.
Figure 10:
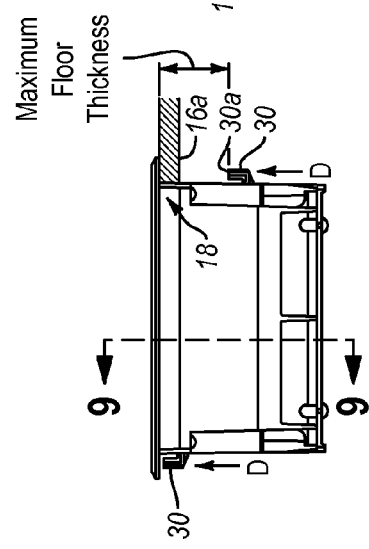
FIG. 10 is, inside elevation view, the service container of FIG. 8.

As seen in the accompanying drawings where similar characters of reference denote corresponding parts in each view, the present invention includes, in one aspect, an in-floor mountable container 10, for example a box 12 like or cylindrical housing 14, mountable into a floor 16 or the like so that the upper rim 18 of the container is substantially flush with the upper surface of the floor, and wherein a lid 20a is mounted in cooperation with the upper rim of the container and adapted so as to present a low profile relative to the floor. In particular, the lid assembly 20 is nested in one embodiment so as to provide a substantially 180 degree pivoting hinge, for example a double pivoting hinge 22 for the lid 20a so that the lid may be opened providing access into the upper opening 10a of the container and folded 5 completely, that is substantially 180 degrees, in an arc in direction A to lie backwards with the distal edge of lid 20a substantially flush against the floor. In this fashion the lid remains relatively low profile even when opens so as to not overly present an obstacle over which a user may trip.

Also provided in the lid assembly is a relatively small trap-door-like pivoting member, referred to herein without intending to be limiting as trap-door 24, that folds for example so as to be 90 degrees or more downwardly relative to the lid 20a when the lid is in its closed portion thereby opening access for cables, etc through a notch 26 in lid 20a. Notch 26 provides an access port in the lid so that when the lid is closed into its covering position on the container, the trap-door depends downwardly under the lid unobtrusively leaving the access port open so that cables or the like (not shown) may be journaled through the port. For example, in the case of electrical cords, the electrical cords extend from the floor, through the access port, and to the electrical outlets 28 mounted in the container. In addition, the upper surface of the lid may have a cut-out portion formed therein and illustrated by outline 20b, into which may be mounted either a flush mounted rigid insert 20c, or alternatively, at the option of the user, a correspondingly sized piece of flooring, carpet or the like (not shown) which, when mounted into the cut-out portion, camouflages the lid of the container when mounted into the floor.

Advantageously, the container is adapted so as to be removably mounted rigidly against the lower surface 16a of the floor so that the container may be mounted rigidly in a hole formed in the floor with rim 18 of the container substantially flush with the rim of the hole in the floor.

In one embodiment, swing-out brackets 30 are mounted to recesses within the side walls 10b of the container. The brackets 30 swing flush into the recesses to accommodate insertion of the container 10 through the snug hole in the floor. The brackets 30 also accommodate clamping the container to the floor. To do so brackets 30 are deployed outwardly laterally by their rotation from a stowed position mounted flush within recesses 10c in side walls 10b of the container through a 90 degree rotation to an outwardly rotated position so as to be outwardly cantilevered from the side walls of the container into a position extending underneath the floor. The swing-out brackets 30 are threadably mounted on a vertical elongate threaded member such as threaded bolt 32. Bolts 32 each provide a screw drive which by rotating the bolt in direction B about its longitudinal axis C elevates in direction D the position of swing-out brackets 30 along the corresponding bolts 32. Thus, for example rotating the bolts 32 clockwise, will, using conventionally threaded bolts, draw the swing-out brackets upwardly along the threaded coupling between the brackets 30 and the bolts 32 so as to draw the contact end 30a of each bracket 30 up against the under surface 16a of the floor. Further advantageously, the brackets in a conventionally threaded, threaded coupling are mounted so as to rotate clockwise when viewed from above, i.e. direction B from their stowed position to their deployed position. The friction between the bolts 32 and the corresponding threaded bores in the bracket 30 cause the bracket to initially swing outwardly from the brackets 30 from their stowed position due to the friction exerted by rotation of the bolts 32. This initial friction rotates the bolts 32 outwardly into their extended or deployed positions until their rotation is arrested by the brackets 30 engaging against a rigid stop, for example, the rigid edge or wall of the corresponding recess 10c of the sidewall. Continued rotation of the bolts 32 about their longitudinal axes C by the workmen using for example a screwdriver, after initially rotating the brackets 30 outwardly until they engage against their stops, thereafter causes the bolts 32 to rotate in their threaded coupling with their bracket 30 thereby drawing the bracket upwardly. Conversely, to remove a container thus mounted under a floor, a workman unscrews the bolts 32 thereby lowering the brackets along the bolts until they are free from the underside of the floor at which time then the friction between each bolt and its bracket causes the bracket to retract to its stowed position recessed into its recess 10c in the corresponding side wall of the container.

The lid assembly 20 may include an outer rim 34 mountable to the upper edge or corresponding rim 10d of the container. The outer rim 34 may be an outwardly extending thin flange. When the lid assembly is mounted to the container, and the container inserted into the hole in the floor, rim 10d and/or flange or rim 34 engage the edge of the hole so as to prevent the container from falling through the hole in the floor. The pivoting lid 20a of the lid assembly may be shaped so as to correspond to substantially the size and shape of the upper opening 10a of the container. The trap-door 24 may be pivotally mounted by a shaft, pins 24a or the like to the lid 20a, for example, in oppositely disposed relation to the double pivoting hinge 22 of the lid. The double pivoting hinge 22 of the lid may include an elongate, for example, substantially rectangular hinge block 22a supporting a pair of parallel spaced apart shafts or pins 22b, where one shaft or set of co-linear pins 22b are rotatably mounted for rotation between one edge of the hinge block and a corresponding portion of the rim 34, and wherein the opposite shaft or co-linear pins 22b on the hinge block are mounted on an opposite hinge of the hinge block for relative rotation between the hinge block and the corresponding portion of the lid 20a. In this manner, as the lid 20a is lifted from its flush mounting within the confines of flange or rim 34, for example by a user inserting a finger into a finger notch 36 or the like formed in the trap-door 24 or lid 20a so as to engage the finger under the undersurface of the trap-door or lid, pulling upwardly on the finger notch then lifts the lid 20a in direction A upwardly and clear of flange or rim 34 so as to allow rotation of the lid relative to the hinge block 22a also and simultaneous rotation of the hinge block 22a relative to flange or rim 34. Thus if the lid 20a rotates for example 90 degrees relative to the hinge block and the hinge block rotates a further 90 degrees relative to flange or rim 34, the lid 20a thereby may be rotated approximately 180 degrees backwardly in direction A up and over the flange or rim 34 so as to rest the distal or free edge of the lid backwardly on the adjoining portion of the floor 16, substantially flush against the floor.

As seen in FIG. 11, in a second embodiment the container of the present invention, includes a generally cylindrical supporting thereunder an electrical box 38 cooperating with the hollow internal cavity of the housing 14. Thus, as with the embodiment of FIG. 1, a user lifts lid assembly 20' in direction A as better seen in FIGS. 12-16 so as to open lid 20a' in direction A from its closed position as seen in FIG. 11 through 180 degrees to a fully open position rotated backwardly flush against floor 16 when container 10 is mounted in a correspondingly sized hole in floor 16.

Again, as in the first embodiment, lid 20a' pivots 180 degrees by the use of a double-acting hinge or double-pivoting 22 which includes hinge block 22a pivotally mounted both to the upper portion of housing 14, for example to its upper rim to corresponding flange, and to lid 20a' by means of pins 22b.

A finger notch 36 is formed in the side of lid 20a' opposite from hinge 22. An oppositely disposed pair of trap-doors 24' are pivotally mounted to opposite sides of lid 20a'. As seen in the sequence of views of FIGS. 12-16, once lid 20a' has been opened, one or both trap-doors 24' may be folded underneath lid 20a' and lid 20a' re-closed down onto its flush mounting in rim 34' thereby leaving access ports defined by notches 26' opened so that power cords plugged into electrical box 38 may be journaled out through the notches for use while leaving lid 20a' closed.

Figure 17:
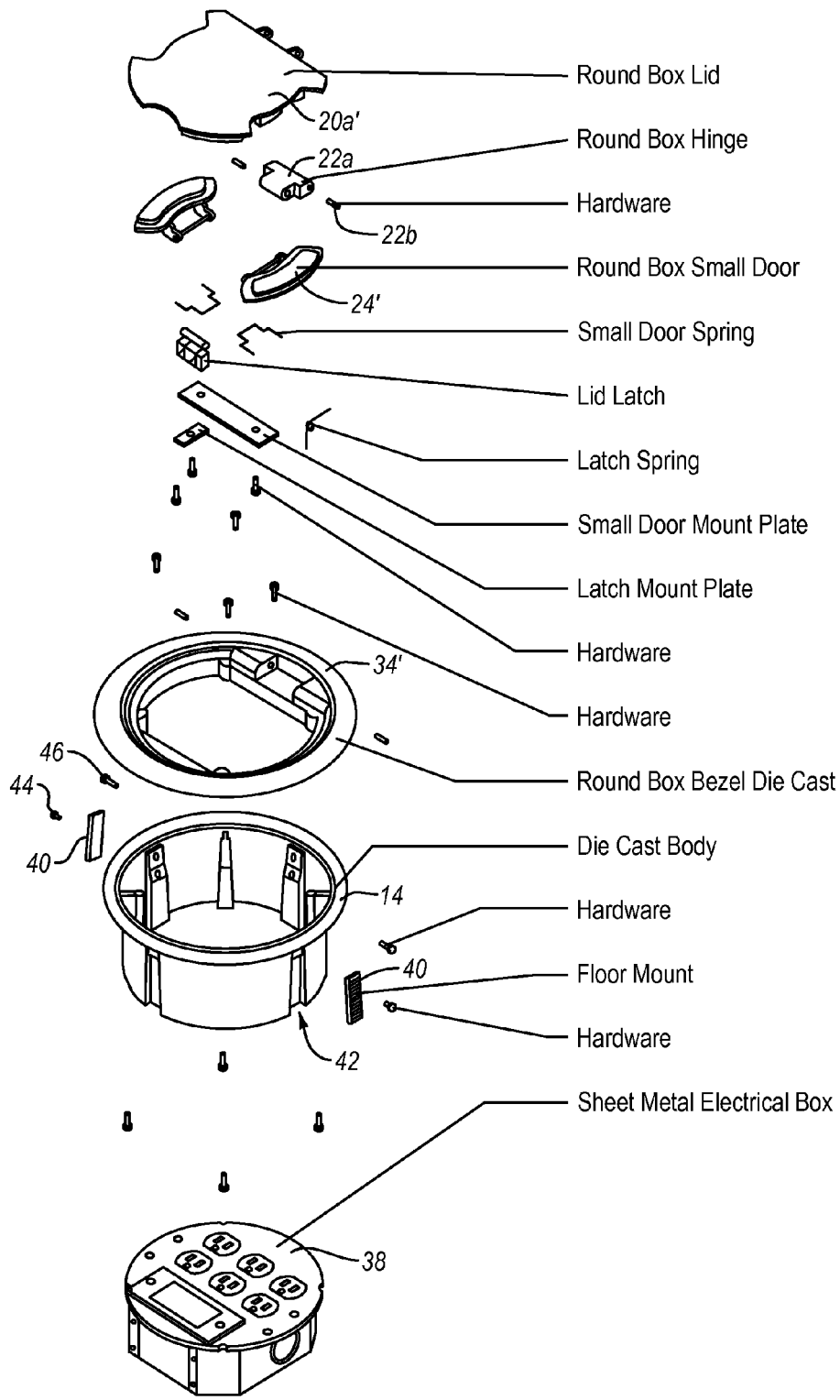
FIG. 17 is, in exploded view, the service container and lid of FIG. 11.

As better seen in FIG. 17, housing 14 may be secured within its hole in floor 16, assuming the hole on the floor is a relatively snug fit, by the use of floor mount latch bars 40. Floor mount latch bars are mounted at their upper ends to an upper portion of housing 14, within corresponding recesses 42 by means of fasteners 44. Fasteners 44 allow latch bars 40 to pivot slightly outwardly from within recesses 42 so as to engage the lower, that is, the free ends of latch bars 40 against the underside of floor 16 as the lower end of latch bars 40 are urged outwardly of housing 14 by actuators such as threaded bolts 46. Alternately, latch bars 40 may be of resilient material so that they may be rigidly fastened at their upper end by fasteners 44 and resiliently deflected outwardly from recesses 42 by the operation of actuators operating from within recesses 42, for example, again by means of bolts 46 which extend from the interior cavity of housing 14 and through the corresponding sidewalls so as to protrude into recesses 42 behind the lower ends of latch bars 40.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A floor-mountable container comprising:
   a housing including an outer surface, an inner surface at least partially defining an interior space within the housing, and a top opening for accessing the interior space;
   a flange connected to the housing and extending laterally from the outer surface and about the top opening of the housing, the flange being configured to rest on a floor when the container is mounted in a hole in the floor and including a topmost surface;
   a hinge block pivotally connected to the container via a first shaft attached to the flange or a first pair of co-linear pins attached to the flange, the hinge block including a topmost surface, a first end portion pivotally connected to the first shaft or the first pair of co-linear pins, and a second end portion opposite the first end portion, the second end portion having a second shaft or a second pair of co-linear pins, the hinge block being movable between a first position, wherein the topmost surface of the hinge block is substantially coplanar with the topmost surface of the flange, and a second position, wherein the second end portion of the hinge block is rotated above the flange; and
   a lid including a topmost surface and pivotally connected to the housing via the second shaft or the second pair of co-linear pins of the hinge block, the lid being movable between a first position, wherein the topmost surface of the lid extends at least in part across the top opening and is substantially coplanar with the topmost surface of the hinge block and the topmost surface of the flange, and a second position, wherein the to most surface of the lid is rotated about 180 degrees relative to the topmost surface of the flange providing access to the top opening and interior space of the housing, the lid further including a notch formed in the lid and a trap-door within the notch, the trap-door being configured to cover the notch when the trap-door is in a first position and to provide access to the top opening of the housing when the trap-door is in a second position.

2. The container as recited in claim 1, wherein:
   the trap-door is configured to pivot between the first position and the second position of the trap-door; and
   the trap-door is sized and configured to nest in the notch when the trap-door is in the first position.

3. The container as recited in claim 1, wherein the hinge block is pivotally mounted proximate a first edge of the flange.

4. The container as recited in claim 1, wherein the lid comprises a plurality of notches and a plurality of corresponding trap-doors configured to fit into the plurality notches.

5. The container as recited in claim 4, wherein the plurality of notches comprise:
   a first notch and a second notch;
   and a plurality of trap-doors comprises a first trap-door and a second trap-door.

6. The container as recited in claim 5, wherein the first and second trap-doors are disposed proximate to opposite edges of the lid.

7. The container as recited in claim 1, wherein a finger notch is formed in an edge of the lid, and wherein the finger notch is sized for a user to insert at least an end of a finger in order to pull open the lid.

8. The container as recited in claim 1, further comprising:
   a finger notch in the flange, disposed proximate to a second edge of the flange;
   wherein the second edge is opposite to the first edge of the flange.

9. The container as recited in claim 1, wherein the lid further comprises a cut-out portion and a lid insert configured to be inserted into the cut-out portion.

10. The container as recited in claim 9, wherein the lid insert is configured to be similar in appearance to the floor.

11. The floor-mountable container of claim 1, further comprising a latch bar having a first end mounted to the outer surface of the housing and a second free end, and an actuator extendable through an aperture formed in the housing that extends between the interior space of the housing and the outer surface of the housing, the actuator being configured to selectively urge the second free end of the latch bar away from the outer surface of the housing toward the flange.

12. The floor-mountable container of claim 11, wherein the actuator is an elongate threaded member that is threadedly engaged with the aperture.

13. The floor-mountable container of claim 1, further comprising:
   a vertical elongate threaded member attached to the housing;
   a swing-out bracket threadedly mounted on the threaded member, the swing-out bracket being deployable radially outward from a recess formed in the outer surface of the housing and vertically into a position extending underneath the floor to secure the floor between the swing-out bracket on one side of the floor and the flange on the other side of the floor opposite the swing-out bracket.

14. The floor-mountable container of claim 13, wherein rotation of the threaded member moves the swing-out bracket vertically along a longitudinal axis of the threaded member and rotates the swing-out bracket relative to the longitudinal axis.

15. A floor-mountable container comprising:
   a housing including an outer surface, an inner surface at least partially defining an interior space within the housing, and a top opening for accessing the interior space;
   a flange connected to the housing and extending laterally from the outer surface and about the top opening of the housing, the flange being configured to rest on a floor when the container is mounted in a hole in the floor and including a topmost surface;
   a hinge block pivotally connected to the container via a first shaft attached to the flange or a first pair of co-linear pins attached to the flange, the hinge block including a topmost surface, a first end portion pivotally connected to the first shaft or the first pair of co-linear pins, and a second end portion opposite the first end portion, the second end portion having a second shaft or a second pair of co-linear pins, the hinge block being movable between a first position, wherein the topmost surface of the hinge block is substantially coplanar with the topmost surface of the flange, and a second position, wherein the second end portion of the hinge block is rotated above the flange; and
   a lid including a topmost surface and pivotally connected to the housing via the second shaft or the second pair of co-linear pins of the hinge block, the lid being movable between a first position, wherein the topmost surface of the lid extends at least in part across the top opening and is substantially coplanar with the topmost surface of the hinge block and the topmost surface of the flange, and a second position, wherein the topmost surface of the lid is rotated about 180 degrees relative to the topmost surface of the flange providing access to the top opening and interior space of the housing, the lid further including a notch formed in the lid and a trap-door within the notch, the trap-door being configured to cover the notch when the trap-door is in a first position and to provide access to the top opening of the housing when the trap-door is in a second position;

a latch bar having a first end mounted to the outer surface of the housing and a second free end; and an actuator extendable through an aperture formed in the housing that extends between the interior space of the housing and the outer surface of the housing, the actuator being configured to selectively urge the second free end of the latch bar away from the outer surface of the housing and toward the flange to secure the floor between the latch bar on one side of the floor and the flange on the other side of the floor opposite the latch bar.

16. The floor-mountable container of claim 15, wherein the outer surface of the housing includes a recess within which the latch bar is mounted, wherein the latch bar configured so that an outward surface of the latch bar is substantially flush with the outer surface of the housing adjacent to the recess when the latch bar is positioned within the recess.

17. The floor-mountable container of claim 16, wherein the outward surface of the latch bar includes a series of ridges that are substantially parallel to the plane on which the flange lies.

18. The floor-mountable container of claim 15, wherein the actuator comprises a threaded screw.

19. The floor-mountable container of claim 18, wherein the actuator is configured to be rotated in order to selectively urge the second free end of the latch bar away from the outer surface of the housing and toward the flange.

20. The floor-mountable container of claim 19, wherein the actuator is accessible from within the interior space of the housing.

21. The floor-mountable container of claim 15, wherein the outer surface of the housing includes a recess within which the latch bar is mounted.

22. The floor-mountable container of claim 21, wherein an outward surface of the latch bar includes a series of ridges.

* * * * *

UNITED STATES PATENT AND TRADEMARK OFFICE
CERTIFICATE OF CORRECTION

| | | |
|---|---|---|
| PATENT NO. | : 8,944,266 B2 | Page 1 of 1 |
| APPLICATION NO. | : 12/232702 | |
| DATED | : February 3, 2015 | |
| INVENTOR(S) | : Roemer et al. | |

It is certified that error appears in the above-identified patent and that said Letters Patent is hereby corrected as shown below:

In the Claims

Column 7
Line 39, change "to most" to --top most--

Signed and Sealed this
Twenty-sixth Day of January, 2016

Michelle K. Lee
*Director of the United States Patent and Trademark Office*